United States Patent
Curtis et al.

(10) Patent No.: US 7,649,902 B2
(45) Date of Patent: Jan. 19, 2010

(54) METHOD AND APPARATUS FOR PERFORMING SYNTAX-DIRECTED APPLICATION LAYER DATA BUFFERING

(75) Inventors: Bruce W. Curtis, San Ramon, CA (US); Darrin P. Johnson, Mountain View, CA (US); Bart Smaalders, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 408 days.

(21) Appl. No.: 11/604,086

(22) Filed: Nov. 22, 2006

(65) Prior Publication Data

US 2008/0117925 A1   May 22, 2008

(51) Int. Cl.
*H04L 12/56* (2006.01)
*H04J 1/16* (2006.01)
(52) U.S. Cl. .................... 370/412; 370/252; 370/428
(58) Field of Classification Search ........... 370/412, 370/252, 428
See application file for complete search history.

(56) References Cited

U.S. PATENT DOCUMENTS

| | | | |
|---|---|---|---|
| 2004/0058634 A1* | 3/2004 | Deware | 451/466 |
| 2005/0198311 A1* | 9/2005 | Smith et al. | 709/227 |
| 2006/0015618 A1* | 1/2006 | Freimuth et al. | 709/226 |
| 2006/0045090 A1* | 3/2006 | Ronciak et al. | 370/392 |
| 2008/0168118 A1* | 7/2008 | Hickey et al. | 709/201 |

\* cited by examiner

*Primary Examiner*—John Pezzlo
(74) *Attorney, Agent, or Firm*—Park. Vaughan & Fleming LLP

(57) ABSTRACT

One embodiment of the present invention provides a system that facilitates buffering data at a kernel in a computer system, wherein the data is buffered based on the structure of a message contained in the data. The system operates by receiving data at a computer system from an external source. Next, the system buffers the data at a kernel on the computer system. As the system buffers the data, the system also determines if the buffered data constitutes a complete message as defined by a communication protocol. If so, the system forwards the buffered data to an application on the computer system.

20 Claims, 4 Drawing Sheets

METHOD AND APPARATUS FOR PERFORMING SYNTAX-DIRECTED APPLICATION LAYER DATA BUFFERING

BACKGROUND

1. Field of the Invention

The present invention relates generally to the field of networking. More specifically, the present invention relates to a method and an apparatus that facilitates syntax-directed application layer data buffering.

2. Related Art

Existing transaction-based applications, such as web servers and application servers, typically presume that clients operate with moderate-to-high bandwidth, and low-to-moderate latency. However, resource-constrained computing devices, such as mobile phones and Personal Digital Assistants (PDAs), are likely to provide both high latency and low bandwidth. This causes applications to get "pinned" waiting for data (e.g., a packet or a set of packets) to be received before the application can processes the incoming data. In addition to "application pinning," the resources associated with the application may also be pinned, thereby tying up valuable resources that could be used to process requests from other devices.

Because these transaction-based applications spend a lot of time waiting for data from high-latency and/or low-bandwidth devices, they typically can only serve a fraction of the devices they could handle if the inbound traffic was received efficiently.

Hence, what is needed is a method and an apparatus for handling incoming requests from computing devices without the problems listed above.

SUMMARY

One embodiment of the present invention provides a system that facilitates buffering data at a kernel in a computer system, wherein the data is buffered based on the structure of a message contained in the data. The system operates by receiving data at a computer system from an external source. Next, the system buffers the data at a kernel on the computer system. As the system buffers the data, the system also determines if the buffered data constitutes a complete message as defined by a communication protocol. If so, the system forwards the buffered data to an application on the computer system.

In a variation on this embodiment, the system forwards the buffered data from the kernel to the application layer on the computer system when a specified amount of data has been buffered.

In a variation on this embodiment, the system forwards the buffered data to the application layer on the computer system when a specified amount of time has elapsed.

In a variation on this embodiment, the external source is a resource-constrained computing device.

In a variation on this embodiment, the communication protocol can include: HyperText Transfer Protocol (HTTP), Secure HyperText Transfer Protocol (HTTPS), File Transfer Protocol (FTP), Simple Network Management Protocol (SNMP), Simple Mail Transfer Protocol (SMTP), Network News Transfer Protocol (NNTP), Remote Desktop Protocol (RDP), Internet Message Access Protocol (IMAP), Post Office Protocol (POP3), Secure Shell (SSH), Real-time Transport Protocol (RTP), and TELNET. Note that any application layer communication protocol may be used, not just the ones listed above.

In a variation on this embodiment, buffering the data at the kernel involves buffering the data in a software buffer.

In a variation on this embodiment, buffering the data at the kernel involves buffering the data in a hardware buffer.

In a variation on this embodiment, the system forwards the buffered data to a second computer system.

DETAILED DESCRIPTION

Figure 1:
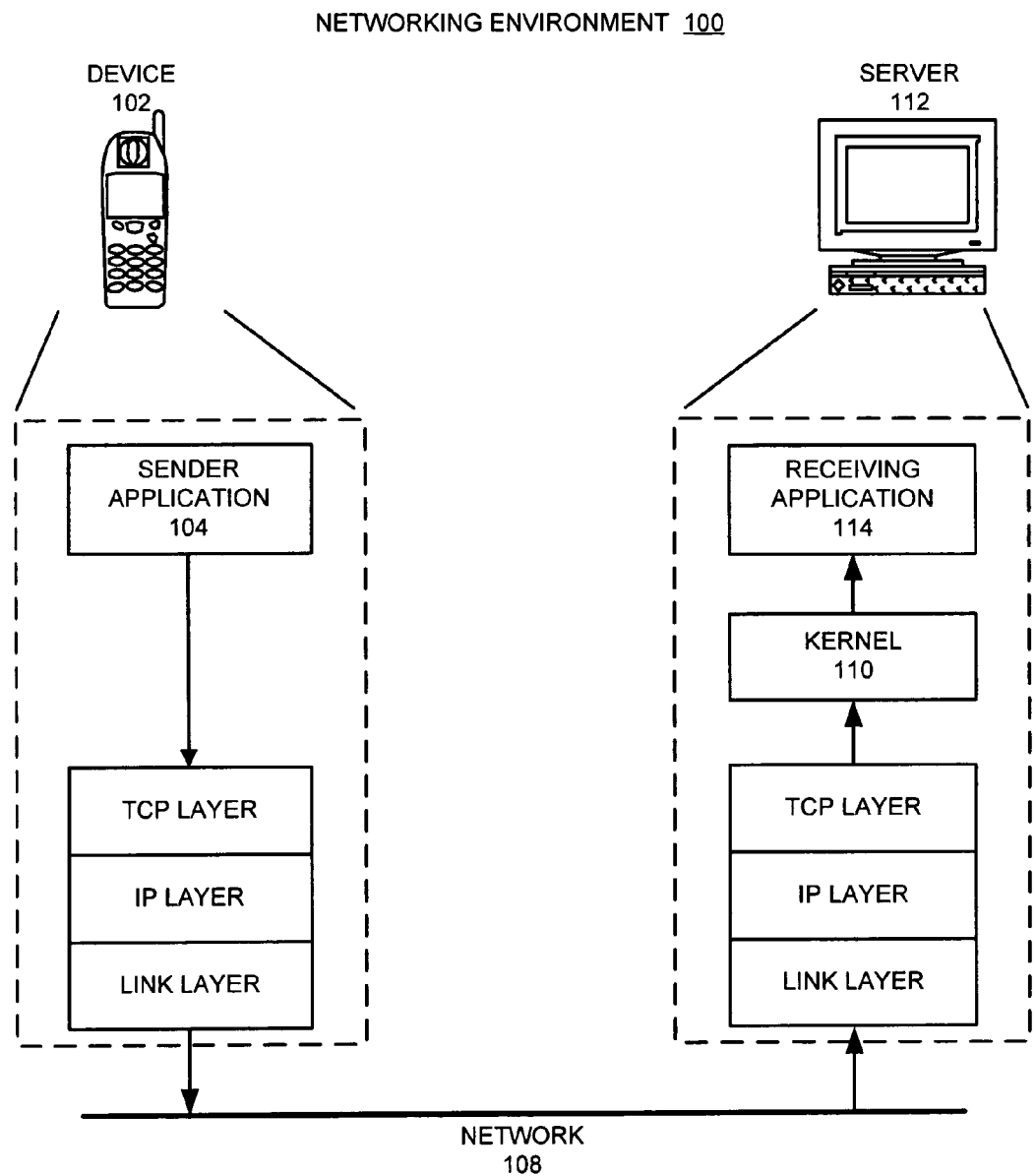
FIG. 1 illustrates a networking environment 100 in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a system that facilitates buffering data at a kernel in a computer system, wherein the data is buffered based on a structure of a message contained in the data. In other words, the data is buffered until an entire message is received, wherein the message boundaries are defined by the semantics of the application layer communication protocol which is being used. This communication protocol can include: HyperText Transfer Protocol (HTTP), Secure HyperText Transfer Protocol (HTTPS), File Transfer Protocol (FTP), Simple Network Management Protocol (SNMP), Simple Mail Transfer Protocol (SMTP), Network News Transfer Protocol (NNTP), Remote Desktop Protocol (RDP), Internet Message Access Protocol (IMAP), Post Office Protocol (POP3), Secure Shell (SSH), Real-time Transport Protocol (RTP), and TELNET. Note that any application layer communication protocol may be used, not just the ones listed above.

In this embodiment, the system operates by receiving data at a computer system from an external source, such as a cell phone. The system then buffers the data at the kernel of the computer system. As the system buffers the data, the system also determines if the buffered data constitutes a complete message as defined by a communication protocol. If so, the system forwards the buffered data to an application on the computer system. For example, the system may wait until an entire HTTP request is received before forwarding the request to the application.

With existing systems, data packets are typically forwarded to the application as they arrive at the server. Each time a data packet is handed off to the application, server resources are tied up as the application receives the data. However, until a complete message is received, the application typically cannot do anything with the data, and typically must wait until the entire message is received. If the packets arrive one at a time over a long period of time, such as occurs with a resource-constrained device that has either low bandwidth, high latency, or both, then the message can tie up a substantial amount of resources on the server for a substantial amount of time. This is akin to listening to someone tell you a long set of instructions one word at a time, while pausing between each word. You typically must wait until you have all of the instructions, and your attention is on the speaker until you have the complete list. It would be much more efficient for you if an intermediary that is more efficient at buffering the information, such as the kernel, collects the entire message before relaying the entire message to you at once.

In one embodiment of the present invention, the system forwards the buffered data to the application layer on the computer system when a specified amount of data has been buffered, or when a specified amount of time has elapsed. These "timeouts" help to prevent denial-of-service attacks, and also to prevent application timeouts caused by incoming data being held too long by the kernel.

In one embodiment of the present invention, the system is implemented in software, while in another embodiment, the system is implemented in hardware. Note that the system can also be implemented as a network appliance or a proxy which acts as a "bump-in-the-line" between the resource-constrained computing device and the server.

In one embodiment of the present invention, the system is implemented as a buffer for transmitting data rather than for receiving data.

Networking Environment

FIG. 1 illustrates a networking environment 100 in accordance with an embodiment of the present invention. Networking environment 100 includes device 102, network 108, and server 112.

Device 102 can generally include any computational node including a mechanism for servicing requests from a client for computational and/or data storage resources. In one embodiment of the present invention, device 102 is a resource-constrained computing device, such as a mobile phone or a Personal Digital Assistant (PDA).

Network 108 can generally include any type of wired or wireless communication channel capable of coupling together computing nodes. This includes, but is not limited to, a local area network, a wide area network, or a combination of networks. In one embodiment of the present invention, network 108 includes the Internet.

Server 112 can generally include any computational node including a mechanism for servicing requests from a client for computational and/or data storage resources.

Device 102 includes sender application 104, which communicates across a network, such as network 108, to a server, such as server 112. Server 112 includes kernel 110 and receiving application 114. Receiving application 114 receives data from applications running on remote devices, such as sender application 104 on device 102.

Buffering Data

Figure 2:
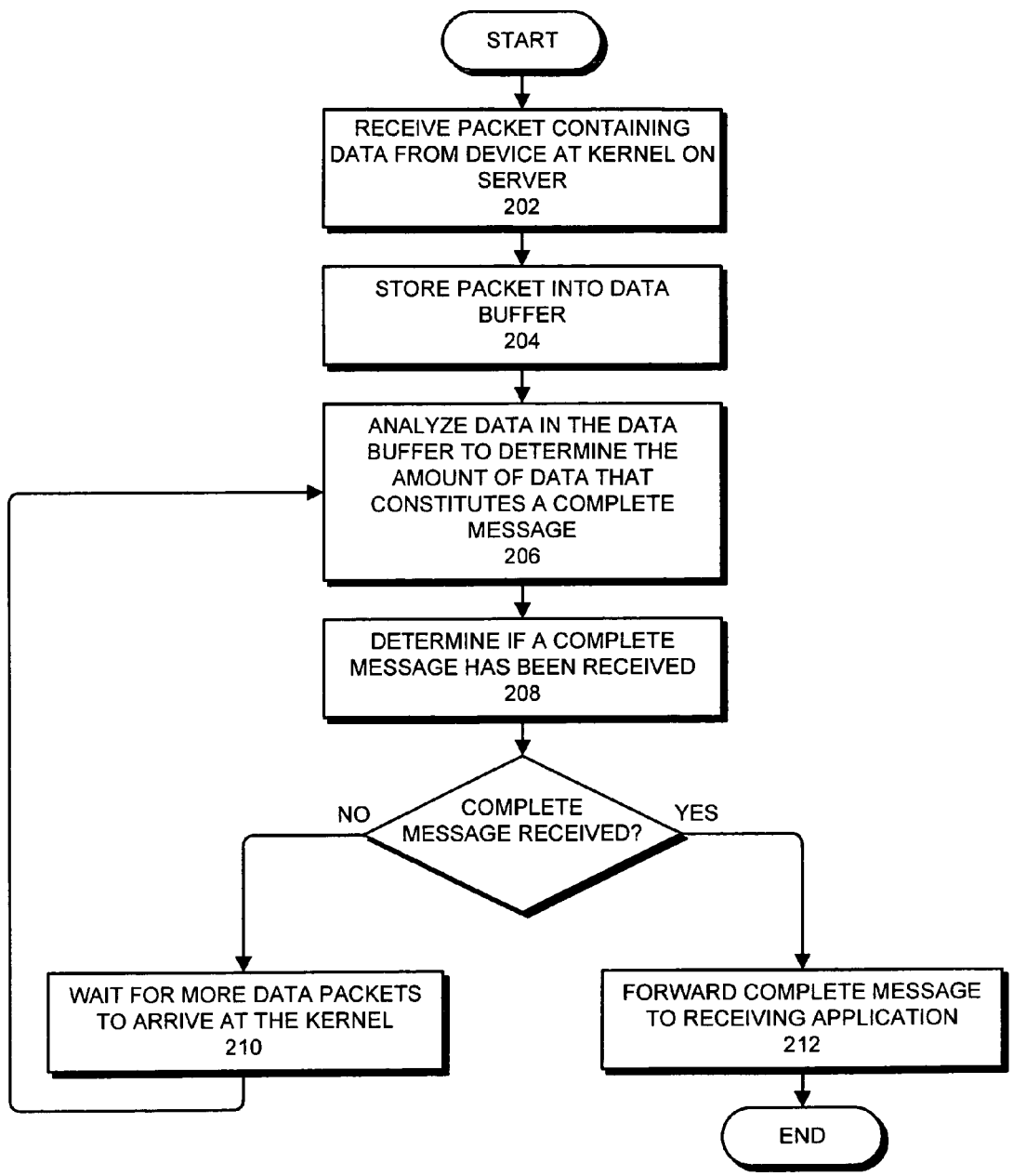
FIG. 2 presents a flowchart illustrating the process of buffering data in the kernel of a computer system in accordance with an embodiment of the present invention.

FIG. 2 presents a flowchart illustrating the process of buffering data in the kernel of a computer system in accordance with an embodiment of the present invention. The system starts by receiving a data packet at kernel 110 of server 112, wherein the data packet originated at a remote computing device, such as device 102 (step 202). Upon receiving the data packet, kernel 110 stores the data packet into a data buffer (step 204). The system then analyzes the data in the data buffer to determine the amount of data that constitutes a complete message (step 206).

Note that the message is defined by the application layer communication protocol for data packets. For example, the data could include an HTTP GET request if the receiving application 114 is a web server application, or could include a request to retrieve an email message via POP3 if the receiving application 114 is a mail server application. An exemplary list of application layer communication protocols is provided above. This list is not meant to be an exhaustive list.

Next, the system determines if a complete message has been received (step 208). If not, the system waits for more packets to arrive at kernel 110 on server 112 (step 210). Note that this process can be implemented in a number of different ways. In one embodiment of the present invention, the system periodically checks to see if a complete message has been received. In another embodiment, the system determines the amount of data that comprises a complete message, and then waits until that amount of data has been received.

Once the complete message has been received, the system forwards data packets comprising the complete message from the buffer to the receiving application 114. Note that in one embodiment of the present invention, the receiving application 114 is running on a separate computing device from server 112. In this embodiment, server 112 is a proxy server or a networking appliance designed to buffer data until complete application layer protocol messages have been received.

In order to prevent denial-of-service attacks or problems caused by malformed messages, the system may also forward data to receiving application 114 after a certain amount of data has been received at kernel 110. Furthermore, many applications have configured timeout values, so that if a message is not received within a certain amount of time, the application terminates the session. For example, if receiving application 114 is a web server, receiving application 114 may have a timeout value of 300 seconds. If it takes kernel 110 310 seconds to receive a complete message from device 102, then by the time kernel 110 forwards the message to receiving application 114, receiving application 114 will have terminated the session and the message will have to be resent. In order to alleviate this problem, in one embodiment of the present invention kernel 110 sends the contents of the data buffer to receiving application 114 after a certain amount of time has elapsed. In the example given, it would be preferable if kernel 110 forwards a partial message prior to reaching the 300 second timeout. Note that each time kernel 110 forwards data to receiving application 114, it causes receiving application 114 to reset the timeout timer. Hence, it may be beneficial to configure kernel 110 to forward the contents of the data buffer to receiving application 114 at a periodic interval which is close to, but less than, the timeout interval.

Buffering Data at a Proxy

Figure 3:
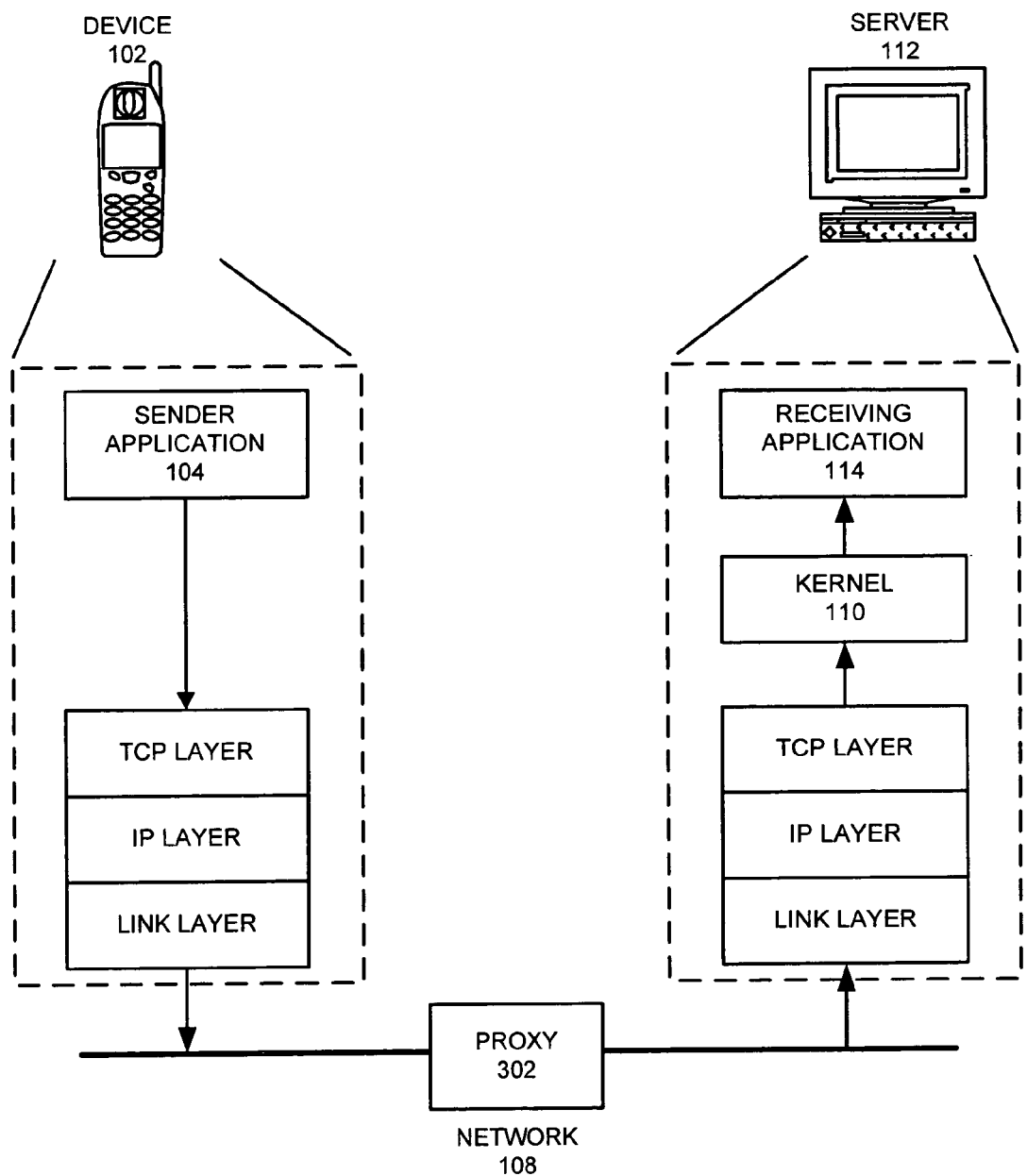
FIG. 3 illustrates a networking environment 300 in accordance with an embodiment of the present invention.

FIG. 3 illustrates a networking environment 300 in accordance with an embodiment of the present invention. Networking environment 100 includes device 102, network 108, server 112, and proxy 302. Note that proxy 302 can generally include any computational node including a mechanism for servicing requests from a client for computational and/or data storage resources. In one embodiment of the present invention, proxy 302 is a network appliance, while in another embodiment, proxy 302 is a server that is identical to server 112, but is configured as a proxy rather than an application server.

Figure 4:
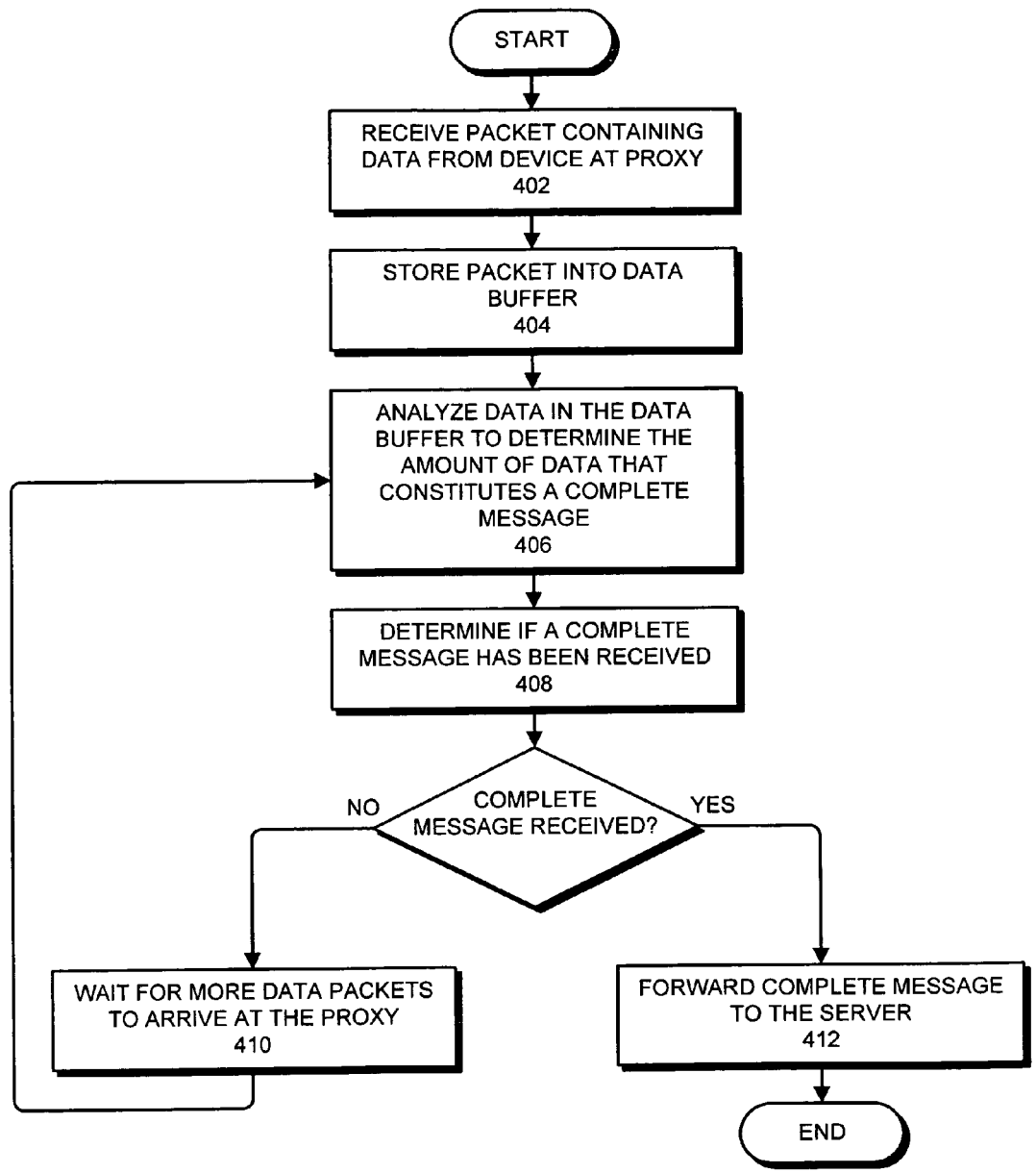
FIG. 4 presents a flowchart illustrating the process of buffering data at a proxy in accordance with an embodiment of the present invention.

FIG. 4 presents a flowchart illustrating the process of buffering data at a proxy 302 in accordance with an embodiment of the present invention. The system starts by receiving a data packet at proxy 302, wherein the data packet originated at a remote computing device, such as device 102 (step 402). Upon receiving the data packet, proxy 302 stores the data packet into a data buffer (step 404). The system then analyzes the data in the data buffer to determine the amount of data that constitutes a complete message (step 206).

Next, the system determines if a complete message has been received at proxy 302 (step 408). If not, the system waits for more packets to arrive at proxy 302 (step 410). Note that this process can be implemented in a number of different ways. In one embodiment of the present invention, the system periodically checks to see if a complete message has been received. In another embodiment, the system determines the amount of data that comprises a complete message, and then waits until that amount of data has been received.

Once the complete message has been received, the system forwards data packets comprising the complete message from proxy 302 to server 112.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for buffering data at a kernel, wherein the data is buffered based on the structure of a message contained in the data, the method comprising:
   receiving data at a computer system from an external source;
   buffering the data at a kernel on the computer system;
   determining if the buffered data constitutes a complete message as defined by a communication protocol; and
   if so, forwarding the buffered data to an application on the computer system;
   if not, forwarding the buffered data to the application prior to reaching a timeout interval associated with the application, thereby avoiding the application terminating a session associated with the buffered data.

2. The method of claim 1, further comprising forwarding the buffered data to the application layer on the computer system when a specified amount of data has been buffered.

3. The method of claim 1, further comprising forwarding the buffered data to the application layer on the computer system when a specified amount of time has elapsed.

4. The method of claim 1, wherein the external source is a resource-constrained computing device.

5. The method of claim 1, wherein the communication protocol can include:
   Hypertlext Transfer Protocol (HTTP);
   Secure HypertText Transfer Protocol (HTTPS);
   File Transfer Protocol (FTP);
   Simple Network Management Protocol (SNMP);
   Simple Mail Transfer Protocol (SMTP);
   Network News Transfer Protocol (NNTP);
   Remote Desktop Protocol (RDP);
   Internet Message Access Protocol (IMAP);
   Post Office Protocol (POP3);
   Secure Shell (SSH);
   Real-time Transport Protocol (RTP); and TELNET.

6. The method of claim 1, wherein buffering the data at the kernel involves buffering the data in a software buffer.

7. The method of claim 1, wherein buffering the data at the kernel involves buffering the data in a hardware buffer.

8. The method of claim 1, further comprising forwarding the buffered data to a second computer system.

9. A computer-readable storage medium storing instructions that when executed by a computer cause the computer to perform a method for buffering data at a kernel, wherein the data is buffered based on a communication protocol message contained in the data, the method comprising:
   receiving data at a computer system from an external source;
   buffering the data at a kernel on the computer system;
   determining if the buffered data constitutes a complete message as defined by a communication protocol; and
   if so, forwarding the buffered data to an application on the computer system;
   if not, forwarding the buffered data to the application prior to reaching a timeout interval associated with the application, thereby avoiding the application terminating a session associated with the buffered data.

10. The computer-readable storage medium of claim 9, wherein the method further comprises forwarding the buffered data to the application layer on the computer system when a specified amount of data has been buffered.

11. The computer-readable storage medium of claim 9, wherein the method further comprises forwarding the buffered data to the application layer on the computer system when a specified amount of time has elapsed.

12. The computer-readable storage medium of claim 9, wherein the external source is a resource-constrained computing device.

13. The computer-readable storage medium of claim 9, wherein the communication protocol can include:
   HypertText Transfer Protocol (HTTP);
   Secure HypertText Transfer Protocol (HTTPS);
   File Transfer Protocol (FTP);
   Simple Network Management Protocol (SNMP);
   Simple Mail Transfer Protocol (SMTP);
   Network News Transfer Protocol (NNTP);
   Remote Desktop Protocol (RDP);
   Internet Message Access Protocol (IMAP);
   Post Office Protocol (POP3);
   Secure Shell (SSH);
   Real-time Transport Protocol (RTP); and TELNET.

14. The computer-readable storage medium of claim 9, wherein buffering the data at the kernel involves buffering the data in a software buffer.

15. The computer-readable storage medium of claim 9, wherein buffering the data at the kernel involves buffering the data in a hardware buffer.

16. The computer-readable storage medium of claim 9, wherein the method further comprises forwarding the buffered data to a second computer system.

17. An apparatus configured for buffering data at a kernel, wherein the data is buffered based on a communication protocol message contained in the data, comprising:
   a receiving mechanism configured to receive data at a computer system from an external source;
   a buffering mechanism configured to buffer the data at a kernel on the computer system;

a determination mechanism configured to determine if the buffered data constitutes a complete message as defined by a communication protocol;

a forwarding mechanism configured to forward the buffered data to an application on the computer system if the buffered data constitutes a complete message; and a second forwarding mechanism configured to forward the buffered data to an application on the computer system prior to reaching a timeout interval associated with the application, if the buffered data does not constitute a complete message, thereby avoiding the application terminating a session associated with the buffered data.

18. The apparatus of claim 17, wherein the forwarding mechanism is further configured to forward the buffered data to the application layer on the computer system when a specified amount of data has been buffered.

19. The apparatus of claim 17, wherein the forwarding mechanism is further configured to forward the buffered data to the application layer on the computer system when a specified amount of time has elapsed.

20. The apparatus of claim 17, wherein the forwarding mechanism is further configured to forward the buffered data to a second computer system.

* * * * *

UNITED STATES PATENT AND TRADEMARK OFFICE
CERTIFICATE OF CORRECTION

| | | |
|---|---|---|
| PATENT NO. | : 7,649,902 B2 | Page 1 of 1 |
| APPLICATION NO. | : 11/604086 | |
| DATED | : January 19, 2010 | |
| INVENTOR(S) | : Curtis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 466 days.

Signed and Sealed this

Twenty-third Day of November, 2010

David J. Kappos
*Director of the United States Patent and Trademark Office*